(12) United States Patent
Nicodemus et al.

(10) Patent No.: US 9,716,779 B1
(45) Date of Patent: Jul. 25, 2017

(54) WIRELESS COMMUNICATION SYSTEM

(71) Applicants: Maxine Nicodemus, St. Augustine, FL (US); Melissa Nicodemus, St. Augustine, FL (US); Todd Horn, St. Augustine, FL (US)

(72) Inventors: Maxine Nicodemus, St. Augustine, FL (US); Melissa Nicodemus, St. Augustine, FL (US); Todd Horn, St. Augustine, FL (US)

( * ) Notice: Subject to any disclaimer, the term of this patent is extended or adjusted under 35 U.S.C. 154(b) by 0 days.

(21) Appl. No.: 15/253,133

(22) Filed: Aug. 31, 2016

(51) Int. Cl.
*H04M 1/02* (2006.01)
*H04B 1/3827* (2015.01)
*H04M 1/725* (2006.01)
*H04M 19/04* (2006.01)
*H04M 1/03* (2006.01)

(52) U.S. Cl.
CPC .......... *H04M 1/0256* (2013.01); *H04B 1/385* (2013.01); *H04M 1/7253* (2013.01); *H04B 2001/3861* (2013.01); *H04M 1/03* (2013.01); *H04M 19/047* (2013.01); *H04M 2001/0204* (2013.01); *H04M 2201/38* (2013.01)

(58) Field of Classification Search
CPC .... H04M 1/0256; H04M 1/7253; H04M 1/03; H04M 19/047; H04M 2001/0204; H04M 2201/38; H04B 1/385; H04B 2001/3861
USPC ...................................................... 455/575.6
See application file for complete search history.

(56) References Cited

U.S. PATENT DOCUMENTS

| D243,666 S | 3/1977 | Durante | |
|---|---|---|---|
| 5,659,611 A * | 8/1997 | Saksa | G04G 21/04 379/433.1 |
| 5,987,310 A * | 11/1999 | Gray | H04B 1/385 455/100 |
| 6,035,035 A * | 3/2000 | Firooz | H04B 1/385 379/433.1 |
| 6,141,643 A * | 10/2000 | Harmon | G10L 21/06 235/462.44 |
| 6,212,414 B1 * | 4/2001 | Alameh | H04B 1/385 455/347 |
| 6,285,757 B1 * | 9/2001 | Carroll | H04B 1/385 345/619 |
| 6,380,923 B1 * | 4/2002 | Fukumoto | G06F 1/163 341/22 |
| 6,509,847 B1 * | 1/2003 | Anderson | G06F 1/1616 178/18.01 |
| 6,515,669 B1 * | 2/2003 | Mohri | G06F 3/017 345/418 |

(Continued)

*Primary Examiner* — Hai V Nguyen

(57) ABSTRACT

A wireless communication system includes an electronic device. A first communication unit is worn around a thumb. Thus, the first communication unit is positioned proximate an ear. The first communication unit is in electrical communication with the electronic device. A second communication unit is worn around a finger. Thus, the second communication unit is positioned proximate a mouth. The second communication unit detects spoken words. The second communication unit is in electrical communication with the electronic device. A charging unit is provided. Each of the first communication unit and the second communication unit is selectively placed in electrical communication with the charging unit. Thus, the charging unit charges each of the first communication unit and the second communication unit.

17 Claims, 5 Drawing Sheets

(56) References Cited

U.S. PATENT DOCUMENTS

| | | | | |
|---|---|---|---|---|
| 6,535,605 B1* | 3/2003 | Ghassabian | H04B 1/385 | 379/433.07 |
| 6,567,523 B1* | 5/2003 | Ghassabian | H04B 1/385 | 379/433.1 |
| D482,671 S * | 11/2003 | DiDonato | | D10/31 |
| 6,757,389 B2* | 6/2004 | Firooz | H04B 1/385 | 379/433.1 |
| 6,775,205 B1* | 8/2004 | Sporn | G04B 47/00 | 368/10 |
| 6,848,083 B2* | 1/2005 | Shen | G06F 3/0235 | 341/51 |
| 6,850,773 B1* | 2/2005 | Ghassabian | G04G 21/04 | 379/433.1 |
| 6,859,657 B1* | 2/2005 | Barnard | A61B 5/0028 | 455/343.1 |
| 6,882,870 B2* | 4/2005 | Kivela | H04B 1/38 | 455/41.2 |
| 6,912,287 B1* | 6/2005 | Fukumoto | G06F 1/163 | 379/430 |
| 6,983,169 B2* | 1/2006 | Vogel | H04M 1/72563 | 455/41.2 |
| 7,257,422 B2* | 8/2007 | Loprete | H04M 1/05 | 379/420.04 |
| 7,437,122 B2* | 10/2008 | Choi | H04N 5/38 | 348/E5.093 |
| 7,470,244 B2* | 12/2008 | Harrison, Jr. | G04B 25/00 | 128/869 |
| 7,529,155 B2* | 5/2009 | Fasciano | G04G 9/0076 | 368/10 |
| 7,536,020 B2* | 5/2009 | Fukumoto | G06F 1/163 | 340/384.6 |
| 7,555,136 B2* | 6/2009 | Wang | G02C 11/06 | 381/151 |
| 7,569,762 B2* | 8/2009 | Baum, Jr. | G10H 1/0083 | 84/615 |
| 7,577,459 B2* | 8/2009 | Tuomela | H04B 13/005 | 455/41.1 |
| 7,580,725 B2* | 8/2009 | Delker | H04M 1/72569 | 455/418 |
| 7,844,310 B2* | 11/2010 | Anderson | H04B 1/385 | 379/330 |
| 8,090,418 B2* | 1/2012 | Thiel | H04B 1/385 | 455/575.2 |
| 8,260,384 B2* | 9/2012 | Wulff | A45F 5/00 | 224/267 |
| 8,265,692 B2* | 9/2012 | Fish | H04B 5/0006 | 455/556.1 |
| 8,634,886 B1* | 1/2014 | Samuels | H04B 1/385 | 235/472.01 |
| 8,795,184 B2* | 8/2014 | Niwa | A61B 5/002 | 600/476 |
| 8,830,212 B2* | 9/2014 | Vaganov | G06F 3/03545 | 345/158 |
| 8,860,547 B2* | 10/2014 | Aichi | G08C 17/02 | 340/1.1 |
| 8,896,992 B2* | 11/2014 | Sherlock | G06F 1/163 | 361/679.03 |
| 9,002,420 B2* | 4/2015 | Pattikonda | H04M 1/6041 | 455/41.2 |
| 9,020,170 B2* | 4/2015 | Hosoi | H04R 25/554 | 381/151 |
| 9,485,559 B2* | 11/2016 | Hosoi | H04R 25/554 | |
| 2002/0115478 A1* | 8/2002 | Fujisawa | H04M 1/6505 | 455/567 |
| 2004/0192423 A1* | 9/2004 | Nevermann | G04G 21/00 | 455/575.6 |
| 2005/0009584 A1* | 1/2005 | Park | H04B 1/385 | 455/575.6 |
| 2005/0143152 A1* | 6/2005 | Yueh | H04M 1/05 | 455/575.6 |
| 2005/0207599 A1* | 9/2005 | Fukumoto | G06F 1/163 | 381/151 |
| 2005/0282576 A1* | 12/2005 | Delker | H04M 1/72569 | 455/550.1 |
| 2010/0056233 A1* | 3/2010 | Thiel | H04B 1/385 | 455/575.2 |
| 2010/0267431 A1* | 10/2010 | Fratti | A45F 5/02 | 455/575.6 |
| 2011/0298709 A1* | 12/2011 | Vaganov | G06F 3/03546 | 345/158 |
| 2012/0022382 A1* | 1/2012 | Daisuke | A61B 5/002 | 600/481 |
| 2013/0169420 A1 | 7/2013 | Blount, Jr. | | |
| 2013/0322670 A1* | 12/2013 | Hosoi | H04R 25/554 | 381/315 |
| 2014/0120983 A1* | 5/2014 | Lam | H04W 84/18 | 455/557 |
| 2014/0279528 A1* | 9/2014 | Slaby | H04L 63/0853 | 705/44 |
| 2015/0015489 A1* | 1/2015 | Vaganov | G06F 3/03545 | 345/158 |
| 2015/0062086 A1* | 3/2015 | Nattukallingal | G06F 3/016 | 345/175 |
| 2015/0065090 A1 | 3/2015 | Yeh | | |
| 2015/0172824 A1 | 6/2015 | Huang et al. | | |
| 2015/0185852 A1* | 7/2015 | Guo | G06F 3/017 | 345/156 |
| 2015/0188353 A1* | 7/2015 | Lee | H02J 7/0044 | 320/108 |
| 2015/0277559 A1* | 10/2015 | Vescovi | G06F 3/014 | 345/173 |
| 2015/0318885 A1* | 11/2015 | Earle | H04B 1/385 | 455/575.6 |
| 2015/0327041 A1* | 11/2015 | Nishimura | H04W 4/22 | 455/418 |
| 2015/0338916 A1* | 11/2015 | Priyantha | G06F 3/017 | 345/173 |
| 2016/0098086 A1* | 4/2016 | Li | G01P 13/045 | 345/173 |
| 2016/0171201 A1* | 6/2016 | Schroder | H04B 5/0031 | 726/20 |
| 2016/0254587 A1* | 9/2016 | Jung | H01Q 1/273 | 343/702 |
| 2016/0261299 A1* | 9/2016 | Hosoi | G06F 1/163 | |
| 2016/0261834 A1* | 9/2016 | Li | G06F 3/03545 | |
| 2016/0344241 A1* | 11/2016 | Hong | H02J 50/90 | |
| 2017/0013338 A1* | 1/2017 | Wong | H04R 1/028 | |
| 2017/0033588 A1* | 2/2017 | Wu | H02J 7/025 | |
| 2017/0075425 A1* | 3/2017 | Kursula | G06F 3/014 | |

\* cited by examiner

WIRELESS COMMUNICATION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to communication devices and more particularly pertains to a new communication device for hands free communication on a cell phone.

BRIEF SUMMARY OF THE INVENTION

An embodiment of the disclosure meets the needs presented above by generally comprising an electronic device. A first communication unit is worn around a thumb. Thus, the first communication unit is positioned proximate an ear. The first communication unit is in electrical communication with the electronic device. A second communication unit is worn around a finger. Thus, the second communication unit is positioned proximate a mouth. The second communication unit detects spoken words. The second communication unit is in electrical communication with the electronic device. A charging unit is provided. Each of the first communication unit and the second communication unit is selectively placed in electrical communication with the charging unit. Thus, the charging unit charges each of the first communication unit and the second communication unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
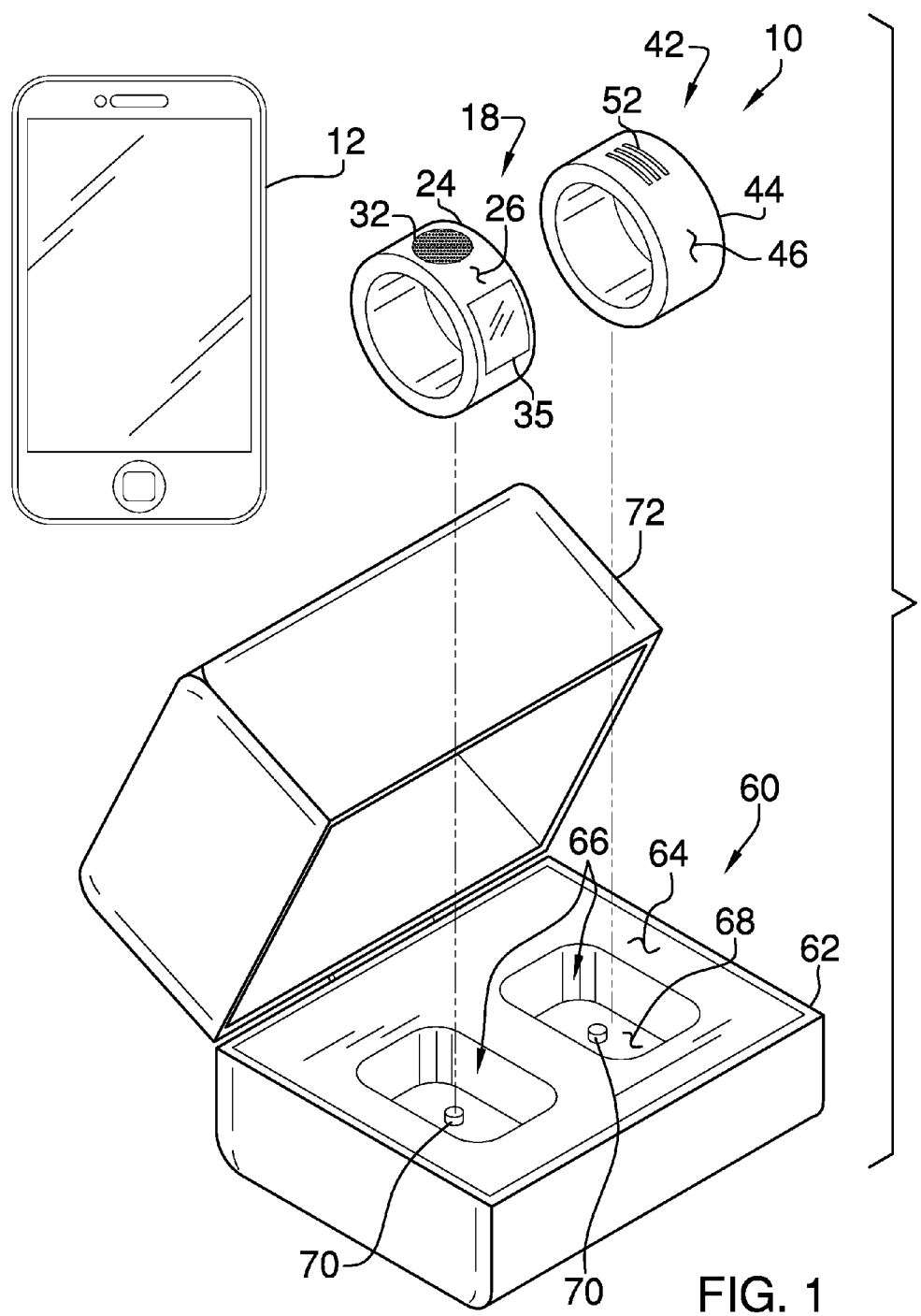
FIG. 1 is a perspective view of a wireless communication system according to an embodiment of the disclosure.
Figure 2:
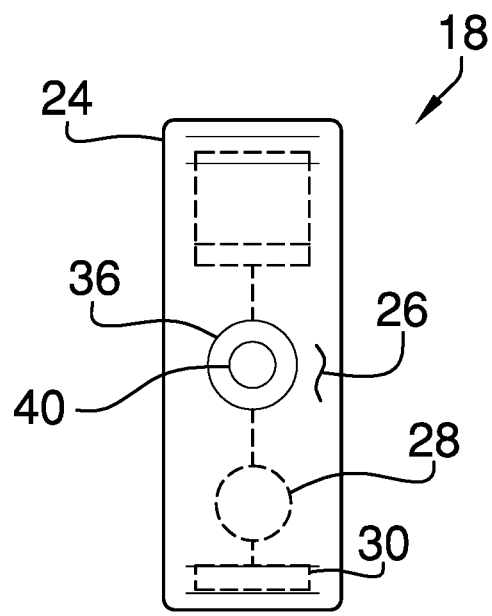
FIG. 2 is a bottom phantom view of a first ring of an embodiment of the disclosure.
Figure 3:
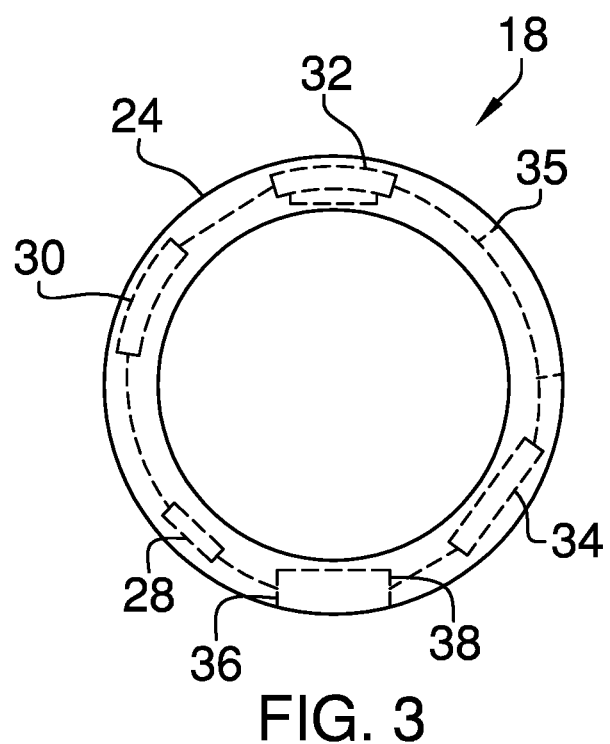
FIG. 3 is a front phantom view of a first ring of an embodiment of the disclosure.
Figure 4:
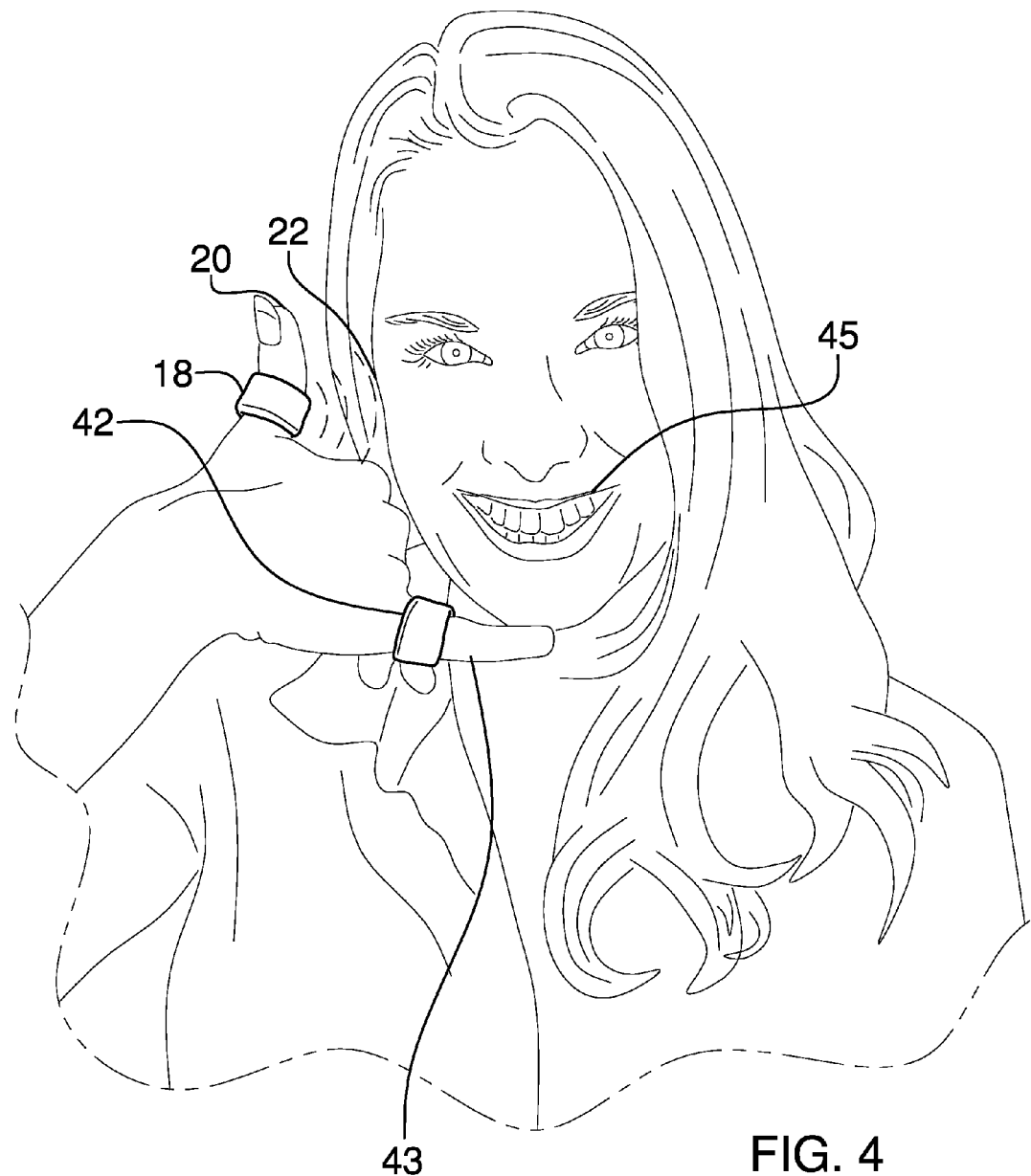
FIG. 4 is a perspective in-use view of an embodiment of the disclosure.
Figure 5:
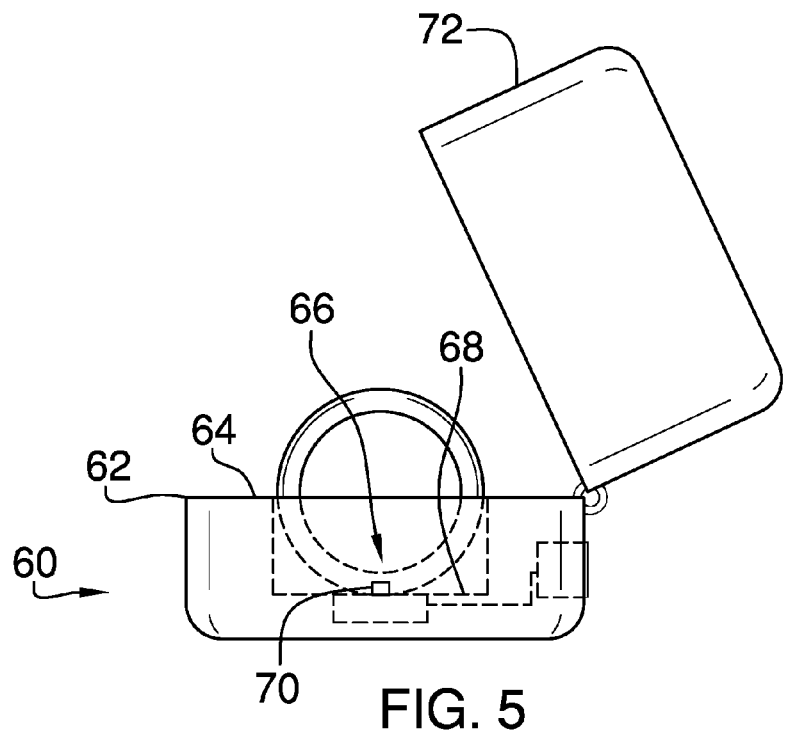
FIG. 5 is a right side phantom view of an embodiment of the disclosure.
Figure 6:
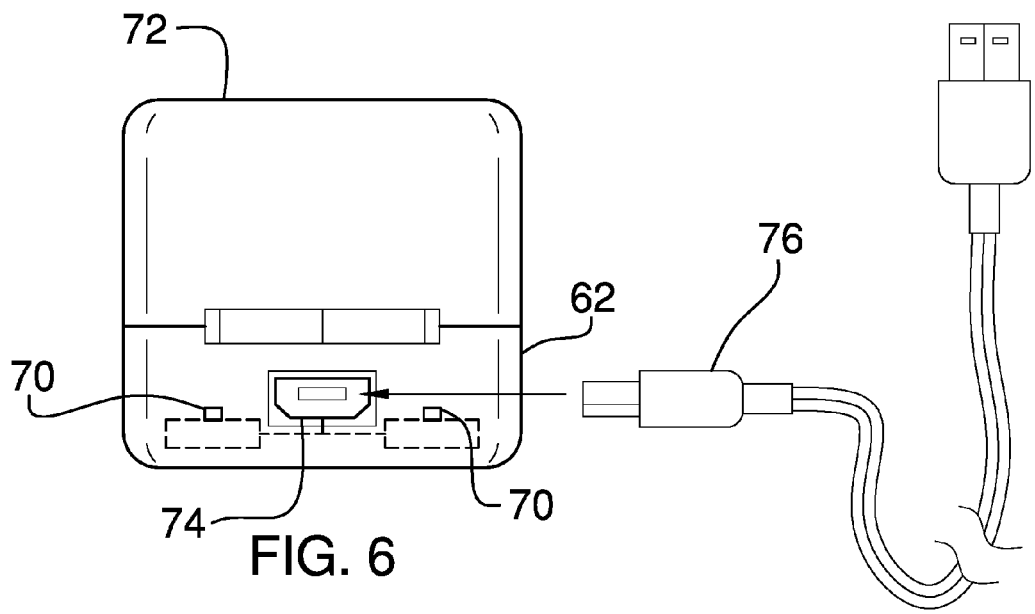
FIG. 6 is a back phantom view of a charging unit of an embodiment of the disclosure.
Figure 7:
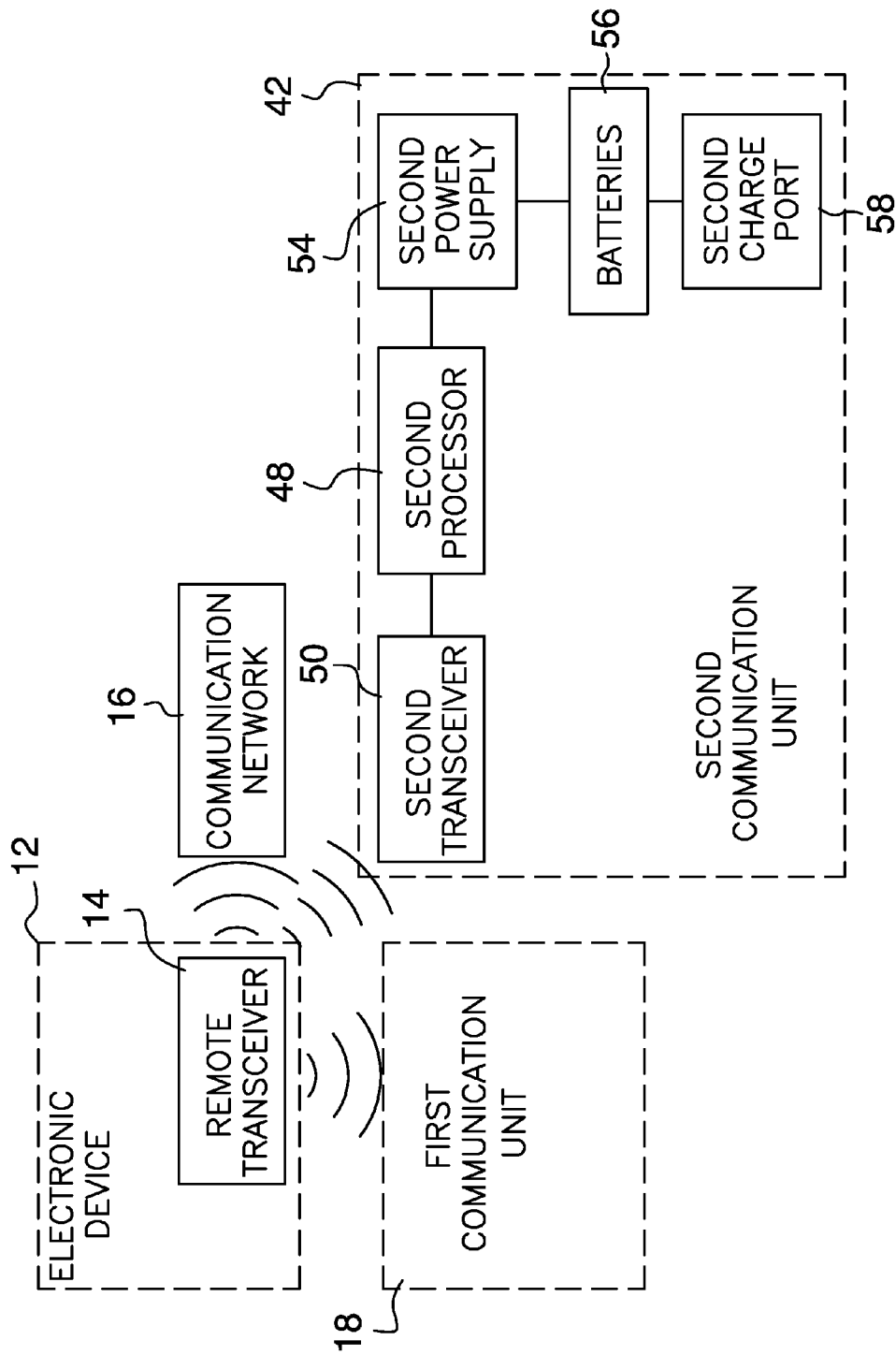
FIG. 7 is a schematic view of an embodiment of the disclosure.

With reference now to the drawings, and in particular to FIGS. 1 through 7 thereof, a new communication device embodying the principles and concepts of an embodiment of the disclosure and generally designated by the reference numeral 10 will be described.

As best illustrated in FIGS. 1 through 7, the wireless communication system 10 generally comprises an electronic device 12 that has a remote transceiver 14. The remote transceiver 14 is in electrical communication with a communication network 16. The electronic device 12 may be a smart phone or the like. The communication network 16 may be a cellular phone network or the like. The remote transceiver 14 may comprise a radio frequency transceiver or the like.

A first communication unit 18 is provided. The first communication unit 18 may be worn around a thumb 20. Thus, the first communication unit 18 may be positioned proximate an ear 22 having the first communication unit 18 emitting audible sound into the ear 22. The first communication unit 18 is in electrical communication with the electronic device 12.

The first communication unit 18 comprises a first ring 24 that has an outer surface 26. The first ring 24 may be worn around the thumb 20. A first processor 28 is provided. The first processor 28 is positioned within the first ring 24. The first processor 28 selectively generates a ring sequence. The first processor 28 may comprise an electronic processor or the like.

A first transceiver 30 is provided and the first transceiver 30 is positioned within the first ring 24. The first transceiver 30 is electrically coupled to the first processor 28. The first transceiver 30 is in electrical communication with the remote transceiver 14. The first processor 28 generates the ring sequence when the first transceiver 30 receives a ring command from the electronic device 12. The first transceiver 30 may comprise a radio frequency transmitter or the like. Moreover, the first transceiver 30 may employ Bluetooth communication protocols.

A speaker 32 is provided and the speaker 32 is coupled to the first ring 24. The speaker 32 is electrically coupled to the first processor 28. The speaker 32 is positioned on the outer surface 26 of the first ring 24. Thus, the speaker 32 emits audible sound. The speaker 32 emits an audible alert when the first processor 28 generates the ring sequence. The audible alert may be a ring tone or the like.

A vibrator 34 is positioned within the first ring 24. The vibrator 34 is electrically coupled to the first processor 28. The first vibrator 34 engages the first ring 24 when the first vibrator 34 is turned on. Thus, the first ring 24 may vibrate the thumb 20. The vibrator 34 is turned on when the first processor 28 generates the ring sequence. The vibrator 34 may comprise a mechanical vibrator 34 or the like.

A display 35 is coupled to the outer surface 26 of the first ring 24. Thus the display 35 may be observed. The display 35 is electrically coupled to the first processor 28. The display 35 displays operational parameters of the first communication unit. Moreover, the display 35 may display caller identification or the like. The display 35 may be a LED or the like.

A first power supply 36 is provided and the first power supply 36 is positioned within the first ring 24. The first power supply 36 is electrically coupled to the first processor 28. The first power supply 36 comprises at least one first battery 38. The at least one first battery 38 is positioned within the first ring 24. A first charge port 40 is positioned on the outer surface 26 of the first ring 24. The first charge port 40 is electrically coupled to the at least one first battery 38.

A second communication unit 42 is provided. The second communication unit 42 may be worn around a finger 43. Thus, the second communication unit 42 may be positioned proximate a mouth 45. The second communication unit 42 detects spoken words. The second communication unit 42 is in electrical communication with the electronic device 12.

The second communication unit 42 comprises a second ring 44 that has an outer surface 46. The second ring 44 may be worn around the finger 43. The finger 43 may be a pinky finger. A second processor 48 is positioned within the second ring 44. The second processor 48 may be an electronic processor or the like.

A second transceiver 50 is provided and the second transceiver 50 is positioned within the second ring 44. The second transceiver 50 is electrically coupled to the second processor 48. Moreover, the second transceiver 50 is in electrical communication with the remote transceiver 14. The second transceiver 50 may comprise a radio frequency transceiver or the like. Additionally, the second transceiver 50 may employ Bluetooth communication protocols.

A microphone 52 is provided and the microphone 52 is coupled to the second ring 44. The microphone 52 is electrically coupled to the second processor 48. The microphone 52 is positioned on the outer surface 46 of the second ring 44 to detect audible sound. Thus, the second transceiver 50 transmits the audible sound to the electronic device 12. The microphone 52 may be an electronic microphone 52 or the like.

A second power supply 54 is positioned within the second ring 44. The second power supply 54 is electrically coupled to the second processor 48. The second power supply 54 comprises at least one second battery 56 that is positioned within the second ring 44. A second charge port 58 is positioned on the outer surface 26 of the second ring 44. The second charge port 58 is electrically coupled to the at least one second battery 56.

A charging unit 60 is provided. Each of the first communication unit 18 and the second communication unit 42 is selectively placed in electrical communication with the charging unit 60. Thus, the charging unit 60 charges each of the first communication unit 18 and the second communication unit 42. The charging unit 60 comprises a cube 62 that has a top surface 64.

The top surface 64 has a pair of wells 66 extending downwardly therein. Each of the wells 66 has a bounding surface 68. Moreover, the bounding surface 68 may be concavely arcuate with respect to the top surface 64. Each of the wells 66 insertably receives an associated one of the first ring 24 and the second ring 44.

The charging unit 60 includes a pair of contacts 70. Each of the contacts 70 is positioned within an associated one of the wells 66. Moreover, each of the contacts 70 is electrically coupled to an associated one of the first charge port 40 and the second charge port 58 when the first ring 24 and the second ring 44 are positioned in the cube 62. A lid 72 is hingedly coupled to the cube 62. The lid 72 covers the top surface 64 when the lid 72 is closed.

A third charge port 74 is coupled to the cube 62. The third charge port 74 is electrically coupled to each of the contacts 70. The third charge port 74 is selectively electrically coupled to a power source 76. The third charge port 74 charges each of the at least one first battery 38 and the at least one second battery 56. The third charge port 74 may be a usb port or the like. The power source 76 may be a usb cable that is electrically coupled to a charger or the like.

In use, each of the first ring 24 and the second ring 44 are positioned in the charging unit 60 to charge. The first ring 24 is worn on the thumb 20 and the second ring 44 is worn on the finger 43. Each of the first transceiver 30 and the second transceiver 50 is synched with the remote transceiver 14. The first ring 24 vibrates and the speaker 32 emits the audible alert when the electronic device 12 receives a phone call. The thumb 20 is positioned proximate the ear 22 and the finger 43 is positioned proximate the mouth 45. The microphone 52 is spoken into to make a phone call. The speaker 32 emits sound associated with the phone call.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:
1. A wireless communication system comprising:
an electronic device having a remote transceiver, said remote transceiver being configured to be in electrical communication with a communication network;
a first communication unit being configured to be worn around a thumb thereby facilitating said first communication unit to be positioned proximate an ear having said first communication unit emitting audible sound into the ear, said first communication unit being in electrical communication with said electronic device;
a second communication unit being configured to be worn around a finger thereby facilitating said second communication unit to be positioned proximate a mouth 45, said second communication unit being configured to detect spoken words, said second communication unit being in electrical communication with said electronic device; and
a charging unit having each of said first communication unit and said second communication unit being selectively placed in electrical communication with said charging unit such that said charging unit charges each of said first communication unit and said second communication unit.

2. The system according to claim 1, wherein said first communication unit comprises a first ring having an outer surface, said first ring being configured to be worn around the thumb.

3. The system according to claim 2, further comprising a first processor being positioned within said first ring, said first processor selectively generating a ring sequence.

4. The system according to claim 3, further comprising a first transceiver being positioned within said first ring, said first transceiver being electrically coupled to said first processor, said first transceiver being in electrical communication with said remote transceiver, said first processor generating said ring sequence when said first transceiver receives a ring command from said electronic device.

5. The system according to claim 2, further comprising a vibrator being positioned within said first ring, said vibrator being electrically coupled to said first processor, said first vibrator engaging said first ring when said first vibrator is turned on wherein said first ring is configured to vibrate the thumb, said vibrator being turned on when said first processor generates said ring sequence.

6. The system according to claim 2, further comprising a first power supply being positioned within said first ring, said first power supply being electrically coupled to said first processor.

7. The system according to claim 6, wherein said first power supply comprises:
at least one first battery being positioned within said first ring, and
a first charge port being positioned on said outer surface of said first ring, said first charge port being electrically coupled to said at least one first battery.

8. The system according to claim 1, wherein said second communication unit comprises a second ring having an outer surface, said second ring being configured to be worn around the finger.

9. The system according to claim 8, further comprising:
a second processor being positioned within said second ring; and
a second transceiver being positioned within said second ring, said second transceiver being electrically coupled to said second processor, said second transceiver being in electrical communication with said remote transceiver.

10. The system according to claim 9, further comprising a microphone being coupled to said second ring, said microphone being electrically coupled to said second processor, said microphone being positioned on said outer surface of said second ring wherein said microphone is configured to detect audible sound thereby facilitating said second transceiver to transmit the audible sound to said electronic device.

11. The system according to claim 9, further comprising a second power supply being positioned within said second ring, said second power supply being electrically coupled to said second processor.

12. The system according to claim 11, wherein said second power supply comprises:
at least one second battery being positioned within said second ring, and
a second charge port being positioned on said outer surface of said second ring, said second charge port being electrically coupled to said at least one second battery.

13. The system according to claim 12, wherein said charging unit comprises a cube having a top surface, said top surface having a pair of wells extending downwardly therein, each of said wells having a bounding surface, said bounding surface being concavely arcuate with respect to said top surface, each of said wells insertably receiving an associated one of said first ring and said second ring.

14. The system according to claim 13, further comprising a pair of contacts, each of said contacts being positioned within an associated one of said wells, each of said contacts being electrically coupled to an associated one of said first charge port and said second charge port when said first ring and said second ring are positioned in said cube.

15. The system according to claim 13, further comprising a lid being hingedly coupled to said cube, said lid covering said top surface when said lid is closed.

16. The system according to claim 13, wherein a third charge port being coupled to said cube, said third charge port being electrically coupled to each of said contacts, said third charge port being configured to be electrically coupled to a power source, said third charge port charging each of said at least one first battery and said at least one second battery.

17. A wireless communication system comprising:
an electronic device having a remote transceiver, said remote transceiver being configured to be in electrical communication with a communication network;
a first communication unit being configured to be worn around a thumb thereby facilitating said first communication unit to be positioned proximate an ear having said first communication unit emitting audible sound into the ear, said first communication unit being in electrical communication with said electronic device, said first communication unit comprising:
a first ring having an outer surface, said first ring being configured to be worn around the thumb,
a first processor being positioned within said first ring, said first processor selectively generating a ring sequence,
a first transceiver being positioned within said first ring, said first transceiver being electrically coupled to said first processor, said first transceiver being in electrical communication with said remote transceiver, said first processor generating said ring sequence when said first transceiver receives a ring command from said electronic device, a speaker being coupled to said first ring, said speaker being electrically coupled to said first processor, said speaker being positioned on said outer surface of said first ring wherein said speaker is configured to emit audible sound, said speaker emitting an audible alert when said first processor generates said ring sequence, a vibrator being positioned within said first ring, said vibrator being electrically coupled to said first processor, said first vibrator engaging said first ring when said first vibrator is turned on wherein said first ring is configured to vibrate the thumb, said vibrator being turned on when said first processor generates said ring sequence, a first power supply being positioned within said first ring, said first power supply being electrically coupled to said first processor, said first power supply comprising:
  at least one first battery being positioned within said first ring, and
  a first charge port being positioned on said outer surface of said first ring, said first charge port being electrically coupled to said at least one first battery;

a second communication unit being configured to be worn around a finger thereby facilitating said second communication unit to be positioned proximate a mouth 45, said second communication unit being configured to detect spoken words, said second communication unit being in electrical communication with said electronic device, said second communication unit comprising:
  a second ring having an outer surface, said second ring being configured to be worn around the finger,
  a second processor being positioned within said second ring,
  a second transceiver being positioned within said second ring, said second transceiver being electrically coupled to said second processor, said second transceiver being in electrical communication with said remote transceiver,
  a microphone being coupled to said second ring, said microphone being electrically coupled to said second processor, said microphone being positioned on said outer surface of said second ring wherein said microphone is configured to detect audible sound thereby facilitating said second transceiver to transmit the audible sound to said electronic device, and
  a second power supply being positioned within said second ring, said second power supply being electrically coupled to said second processor, said second power supply comprising:
    at least one second battery being positioned within said second ring, and
    a second charge port being positioned on said outer surface of said second ring, said second charge port being electrically coupled to said at least one second battery; and a charging unit having each of said first communication unit and said second communication unit being selectively placed in electrical communication with said charging unit such that said charging unit charges each of said first communication unit and said second communication unit, said charging unit comprising:
  a cube having a top surface, said top surface having a pair of wells extending downwardly therein, each of said wells having a bounding surface, said bounding surface being concavely arcuate with respect to said top surface, each of said wells insertably receiving an associated one of said first ring and said second ring,
  a pair of contacts, each of said contacts being positioned within an associated one of said wells, each of said contacts being electrically coupled to an associated one of said first charge port and said second charge port when said first ring and said second ring are positioned in said cube,
  a lid being hingedly coupled to said cube, said lid covering said top surface when said lid is closed, and
  a third charge port being coupled to said cube, said third charge port being electrically coupled to each of said contacts, said third charge port being configured to be electrically coupled to a power source, said third charge port charging each of said at least one first battery and said at least one second battery.

* * * * *